United States Patent
Kang et al.

(10) Patent No.: US 9,419,277 B2
(45) Date of Patent: Aug. 16, 2016

(54) COMPOSITE METAL PRECURSOR, ELECTRODE ACTIVE MATERIAL PREPARED FROM THE SAME, POSITIVE ELECTRODE INCLUDING THE SAME, AND LITHIUM SECONDARY BATTERY EMPLOYING THE SAME

(71) Applicant: Samsung SDI Co., Ltd., Yongin-si, Gyeonggi-do (KR)

(72) Inventors: Hak-Seok Kang, Yongin-si (KR); Heung-Min Oh, Yongin-si (KR); Young-Hoon Do, Yongin-si (KR); Myung-Hun Bae, Yongin-si (KR); Suk-Chul Jung, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 114 days.

(21) Appl. No.: 13/750,958

(22) Filed: Jan. 25, 2013

(65) Prior Publication Data

US 2013/0302683 A1   Nov. 14, 2013

(30) Foreign Application Priority Data

May 8, 2012   (KR) .......................... 10-2012-0048822

(51) Int. Cl.
*H01M 4/485* (2010.01)
*H01M 4/52* (2010.01)
*H01M 4/50* (2010.01)
*H01M 4/525* (2010.01)
*H01M 10/052* (2010.01)

(52) U.S. Cl.
CPC .............. *H01M 4/485* (2013.01); *H01M 4/502* (2013.01); *H01M 4/523* (2013.01); *H01M 4/525* (2013.01); *H01M 10/052* (2013.01); *Y02E 60/122* (2013.01)

(58) Field of Classification Search
CPC ..... H01M 10/054; H01M 4/46; H01M 4/466; H01M 4/62; H01M 4/58; H01M 4/52; H01M 4/50; H01M 4/00
USPC .......................................... 429/220, 224, 223
See application file for complete search history.

(56) References Cited

U.S. PATENT DOCUMENTS 4,244,986 A * 1/1981 Paruso .............. H01M 10/3927
                                                        423/600
6,632,763 B2 * 10/2003 Virkar ................... C04B 35/113
                                                        117/84

(Continued)

FOREIGN PATENT DOCUMENTS

JP   2008-282667 A    11/2008
KR   10-2010-0109605 A   10/2010
KR   10-2011-0073630 A   6/2011

OTHER PUBLICATIONS

English Translation of JP2008-282667A, 48 pages.

*Primary Examiner* — Patrick Ryan
*Assistant Examiner* — Kiran Quraishi
(74) *Attorney, Agent, or Firm* — Lewis Roca Rothgerber Christie LLP

(57) ABSTRACT

A composite metal precursor including a composite metal hydroxide represented by Formula 1 below, wherein an amount of magnesium (Mg) in the composite metal hydroxide is less than or equal to 0.005 wt %, an electrode active material formed from the same, a positive electrode including the same, and a lithium secondary battery employing the same:

$$(A_{1-x-y}B_xC_y)(OH)_2 \quad \text{[Formula 1]}$$

wherein in Formula 1, x, y, A, B, and C are as described in the detailed description.

2 Claims, 2 Drawing Sheets

(56) References Cited

U.S. PATENT DOCUMENTS

2002/0172871 A1* 11/2002 Schucker .............. C04B 35/113
    429/304

2006/0093920 A1* 5/2006 Cheon ................... H01M 4/131
    429/232
2008/0248392 A1* 10/2008 Takeuchi ............. C01G 23/002
    429/224

* cited by examiner

COMPOSITE METAL PRECURSOR, ELECTRODE ACTIVE MATERIAL PREPARED FROM THE SAME, POSITIVE ELECTRODE INCLUDING THE SAME, AND LITHIUM SECONDARY BATTERY EMPLOYING THE SAME

CROSS-REFERENCE TO RELATED APPLICATION

This application claims priority to and the benefit of Korean Patent Application No. 10-2012-0048822, filed on May 8, 2012, in the Korean Intellectual Property Office, the disclosure of which is incorporated herein in its entirety by reference.

BACKGROUND

1. Field

One or more embodiments of the present invention relate to a composite metal precursor, an electrode active material prepared from the same, a positive electrode for a lithium secondary battery including the same, and lithium secondary battery employing the same

2. Description of the Related Art

Currently, application of lithium secondary batteries to mobile phones, camcorders, and laptops has been dramatically increased. A factor that determines capacities of batteries is a positive electrode active material, wherein characteristics of usability for a long time at a high rate or maintenance of initial capacity after a charging and discharging cycle are determined according to electrochemical characteristics of the positive electrode active material.

A lithium cobalt oxide or lithium nickel composite oxide is used as the positive electrode active material used in the lithium secondary battery.

However, a general positive electrode active material is still to be improved due to unsatisfactory capacity and lifespan characteristics.

SUMMARY

One or more aspects of embodiments of the present invention are directed toward a composite metal precursor, an electrode active material formed from the same, a positive electrode including the same, and a lithium secondary battery employing the same.

Additional aspects will be set forth in part in the description which follows and, in part, will be apparent from the description, or may be learned by practice of the presented embodiments.

According to one or more embodiments of the present invention, a composite metal precursor includes a composite metal hydroxide represented by Formula 1 below, wherein an amount of magnesium (Mg) in the composite metal hydroxide is less than or equal to 0.005 wt %:

$(A_{1-x-y}B_xC_y)(OH)_2$     [Formula 1]

wherein in Formula 1, $0<x\leq0.3$ and $0\leq y\leq0.5$,

A denotes at least one element selected from the group consisting of nickel (Ni), cobalt (Co), and manganese (Mn), B denotes at least one element selected from the group consisting of Ni, Co, Mn, boron (B), Mg, calcium (Ca), strontium (Sr), barium (Ba), titanium (Ti), vanadium (V), chromium (Cr), iron (Fe), copper (Cu), and aluminum (Al), and C denotes at least one element selected from the group consisting of Ni, Co, Mn, B, Mg, Ca, Sr, Ba, Ti, V, Cr, Fe, Cu, and Al, wherein A, B, and C are differently selected (i.e., A, B, and C are selected to be different elements).

According to one or more embodiments of the present invention, a positive electrode for a lithium secondary battery includes a positive electrode active material represented by Formula 4 below, wherein an amount of magnesium (Mg) in the positive electrode active material is less than or equal to 0.005 wt %:

$Li_m(A_{1-x-y}B_xC_y)O_2$     [Formula 4]

wherein in Formula 4, $1.0\leq m\leq 1.3$, $0<x\leq0.3$, and $0\leq y\leq 0.5$,

A denotes at least one element selected from the group consisting of nickel (Ni), cobalt (Co), and manganese (Mn), B denotes at least one element selected from the group consisting of Ni, Co, Mn, boron (B), magnesium (Mg), calcium (Ca), strontium (Sr), barium (Ba), titanium (Ti), vanadium (V), chromium (Cr), iron (Fe), copper (Cu), and aluminum (Al), and C denotes at least one element selected from the group consisting of Ni, Co, Mn, B, Mg, Ca, Sr, Ba, Ti, V, Cr, Fe, Cu, and Al, wherein A, B, and C are differently selected (i.e., A, B, and C are selected to be different elements).

According to one or more embodiments of the present invention, a lithium secondary battery includes: a positive electrode; a negative electrode; and a separator disposed therebetween, wherein the positive electrode comprises a positive electrode active material represented by Formula 4 below, wherein an amount of magnesium (Mg) in the positive electrode active material is less than or equal to 0.005 wt %:

$Li_m(A_{1-x-y}B_xC_y)O_2$     [Formula 4]

wherein in Formula 4, $1.0\leq m\leq 1.3$, $0<x\leq0.3$, and $0\leq y\leq 0.5$,

A denotes at least one element selected from the group consisting of nickel (Ni), cobalt (Co), and manganese (Mn), B denotes at least one element selected from the group consisting of Ni, Co, Mn, boron (B), magnesium (Mg), calcium (Ca), strontium (Sr), barium (Ba), titanium (Ti), vanadium (V), chromium (Cr), iron (Fe), copper (Cu), and aluminum (Al), and C denotes at least one element selected from the group consisting of Ni, Co, Mn, B, Mg, Ca, Sr, Ba, Ti, V, Cr, Fe, Cu, and Al, wherein A, B, and C are differently selected.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
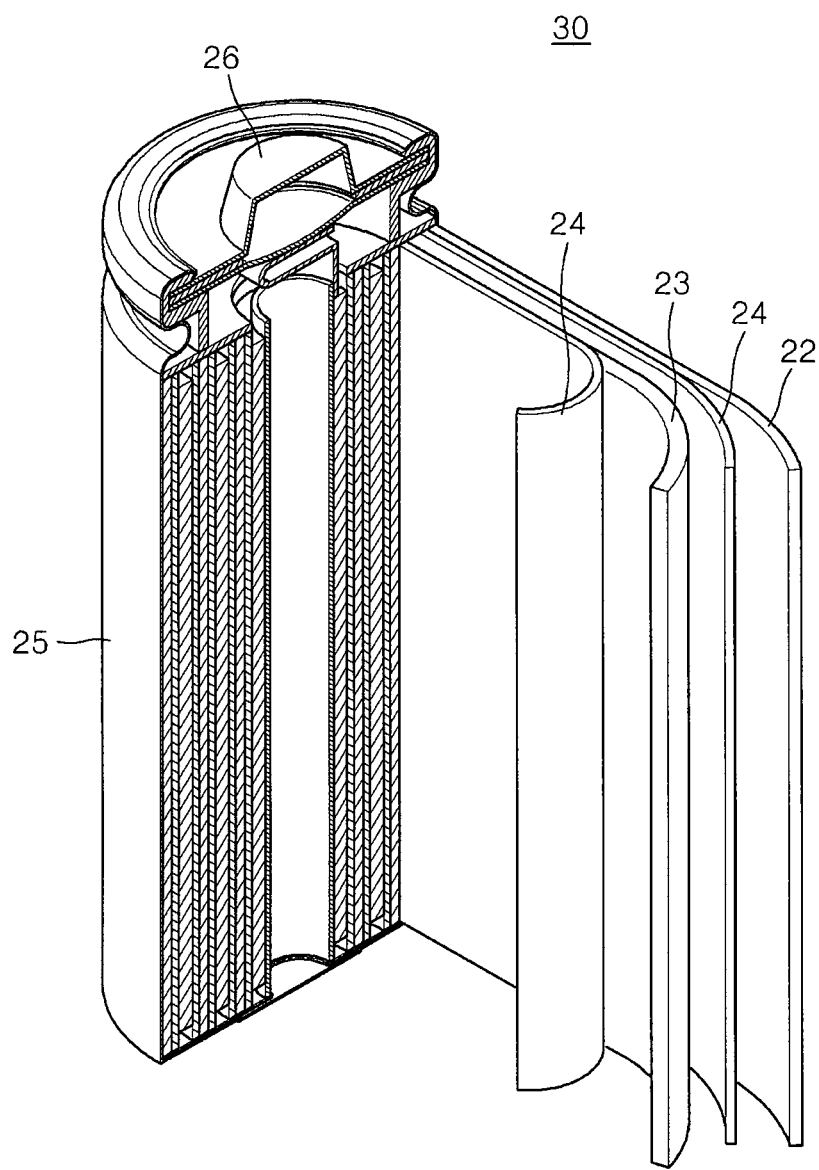
FIG. 1 is a schematic view of a lithium secondary battery according to an embodiment of the present invention.

Reference will now be made in detail to embodiments, examples of which are illustrated in the accompanying drawings. In this regard, the present embodiments may have different forms and should not be construed as being limited to the descriptions set forth herein. Accordingly, the embodiments are merely described below, by referring to the figures, to explain aspects of the present description.

Provided is a composite metal precursor including a composite metal hydroxide represented by Formula 1 below, wherein an amount of magnesium (Mg) in the composite metal hydroxide is less than or equal to 0.005 wt %.

$$(A_{1-x-y}B_xC_y)(OH)_2 \quad \text{[Formula 1]}$$

Here, in Formula 1, $0<x\le0.3$ and $0\le y\le0.5$, A denotes at least one element selected from the group consisting of nickel (Ni), cobalt (Co), and manganese (Mn), B denotes an element selected from the group consisting of Ni, Co, Mn, boron (B), magnesium (Mg), calcium (Ca), strontium (Sr), barium (Ba), titanium (Ti), vanadium (V), chromium (Cr), iron (Fe), copper (Cu), and aluminum (Al), and C denotes at least one element selected from the group consisting of Ni, Co, Mn, B, Mg, Ca, Sr, Ba, Ti, V, Cr, Fe, Cu, and Al, wherein A, B, and C are differently selected (i.e., A, B, and C are elected to be different elements).

The amount of Mg existing in the composite metal hydroxide is less than or equal to 0.005 wt %. The amount of Mg is measured by using an inductively coupled plasma (ICP) analysis.

In one embodiment, when the amount of Mg exceeds 0.005 wt %, capacity and lifespan characteristics of a positive electrode is deteriorated if the positive electrode is manufactured by using the positive electrode active material including the composite metal hydroxide.

The composite metal precursor may be a compound represented by Formula 2 below.

$$(A_{1-x-y}B_xC_y)Mg_a(OH)_2 \quad \text{[Formula 2]}$$

Here, in Formula 2, $0<a\le0.005$, $0<x\le0.3$, and $0\le y\le0.5$, A is at least one element selected from the group consisting of Ni, Co, and Mn, B is at least one element selected from the group consisting of Ni, Co, Mn, B, Mg, Ca, Sr, Ba, Ti, V, Cr, Fe, Cu, and Al, and C is at least one element selected from the group consisting of Ni, Co, Mn, B, Mg, Ca, Sr, Ba, Ti, V, Cr, Fe, Cu, and Al, wherein A, B, and C is differently selected.

In one embodiment, the composite metal hydroxide is represented by Formula 3 below.

$$(Ni_{1-x-y}Co_xMn_y)Mg_a(OH)_2 \quad \text{[Formula 3]}$$

Here, in Formula 3, $0<a\le0.005$, $0<x\le0.3$, and $0\le y\le0.5$.

In Formulas 1 through 3, y may be from about 0 to about 0.3, in detail, from about 0.2 to about 0.3.

According to an embodiment, in Formula 3, x is from about 0.1 to about 0.2, and y is from about 0.2 to about 0.3.

In one embodiment, the composite metal precursor includes one or more negative ions selected from among fluoride ions and chloride ions. In one embodiment, an amount of fluoride ions is from about 0.5 ppm to about 3.5 ppm, and an amount of chlorine ions is from about 1.5 ppm to about 3.5 ppm.

In one embodiment, when the amounts of fluorine and chlorine ions are within the above ranges in the composite metal precursor, high temperature interval lifespan characteristics of the positive electrode containing the positive electrode active material formed from the composite metal precursor are excellent.

The amount of fluorine ions may be from about 0.76 ppm to about 2.99 ppm. Also, the amount of chlorine ions may be from about 2.06 ppm to about 3.11 ppm.

The amount of Mg in the composite metal precursor may be from about 0.001 wt % to about 0.005 wt %, for example, from about 0.0010 wt % to about 0.0035 wt %.

According to an embodiment, the composite metal hydroxide is $Ni_{0.5}Co_{0.2}Mn_{0.3}Mg_{0.001}(OH)_2$ or $Ni_{0.5}Co_{0.2}Mn_{0.3}Mg_{0.0035}(OH)_2$.

An average particle diameter of the composite metal precursor may be equal to or higher than 5 μm, for example, from about 5 μm to about 15 μm. Also, the composite metal precursor has a spherical shape and excellent density characteristics.

For example, a tap density is from about 1.5 g/cm³ to about 2.5 g/cm³, D10 is from about 3 μm to about 8 μm, D50 is from about 5 μm to about 15 μm, and D90 is from about 15 to about 25 μm.

Also, in one embodiment, D10 is from about 6.42 μm to about 6.67 μm, and D50 is from about 11.14 μm to about 11.61 μm. D90 is from about 18.31 μm to about 19.21 μm.

The terms D10, D50, and D90 denote particle diameters respectively corresponding to 10%, 50%, and 90% of passed mass percentages in a grain-size accumulation curve. D50 generally denotes an average particle diameter.

A specific surface area of the composite metal precursor is from about 5 m²/g to about 15 m²/g, and an amount of moisture is from about 0.2 wt % to about 0.5 wt %. In one embodiment, when the specific surface area and the moisture amount are within the above ranges, an interval lifespan of the positive electrode containing the positive electrode active material formed from the composite metal precursor is excellent.

According to another embodiment, a positive electrode active material represented by Formula 4 below is provided, and an amount of magnesium (Mg) in the positive electrode active material is less than or equal to 0.005 wt %.

$$Li_m(A_{1-x-y}B_xC_y)O_2 \quad \text{[Formula 4]}$$

Here, in Formula 4, $1.0\le m\le1.3$, $0<x\le0.3$, and $0\le y\le0.5$, A denotes at least one element selected from the group consisting of Ni, Co, and Mn, B denotes at least one element selected from the group consisting of Ni, Co, Mn, B, Mg, Ca, Sr, Ba, Ti, V, Cr, Fe, Cu, and Al, and C denotes at least one element selected from the group consisting of Ni, Co, Mn, B, Mg, Ca, Sr, Ba, Ti, V, Cr, Fe, Cu, and Al, wherein A, B, and C are differently selected (i.e., A, B, and C are selected to be different elements).

The positive electrode active material may be a compound represented by Formula 5 below.

$$Li_m(A_{1-x-y}B_xC_y)Mg_aO_2 \quad \text{[Formula 5]}$$

Here, in Formula 5, $1.0\le m\le1.3$, $0<a\le0.005$, $0<x\le0.3$, and $0\le y\le0.5$, A is at least one element selected from the group consisting of Ni, Co, and Mn, B is at least one element selected from the group consisting of Ni, Co, Mn, B, Mg, Ca, Sr, Ba, Ti, V, Cr, Fe, Cu, Al, and C is at least one element selected from the group consisting of Ni, Co, Mn, B, Mg, Ca, Sr, Ba, Ti, V, Cr, Fe, Cu, and Al, wherein A, B, and C are differently selected.

The positive electrode active material may be represented by Formula 6 below.

$$Li_m(Ni_{1-x-y}Co_xMn_y)Mg_aO_2 \quad \text{[Formula 6]}$$

Here, in Formula 6, $1.0\le m\le1.3$, $0<a\le0.005$, $0<x\le0.3$, and $0\le y\le0.5$.

In Formulas 4 through 6, y is from about 0 to about 0.3, in detail, from about 0.2 to about 0.3.

An amount of Mg in the positive electrode active material may be from about 0.001 wt % to about 0.005 wt %, for example, from about 0.0008 wt % to about 0.0031 wt %, like in the composite metal precursor.

According to an embodiment, the positive electrode active material is $LiNi_{0.5}Co_{0.2}Mn_{0.3}Mg_{0.001}O_2$ or $LiNi_{0.5}Co_{0.2}Mn_{0.3}Mg_{0.0035}O_2$.

The amounts of Mg in the compound metal hydroxide and positive electrode active material largely affect characteristics of the positive electrode active material formed from the composite metal hydroxide and lithium secondary battery formed by using the positive electrode active material. For example, the amount of Mg is closely related to the high temperature interval lifespan characteristics of the positive electrode including the positive electrode active material.

The high temperature interval lifespan characteristics are evaluated by repeating charging at about 40° C. to about 45° C., and rest and discharging at an interval of about 24 hours. A lifespan is tested under severe conditions instead of general lifespan conditions, and the test takes a long period of time.

Also, the high temperature interval lifespan characteristics are very important characteristics in the lithium secondary battery in terms of user environments. For example, when a battery is charged, the battery is in an unstable state as lithium ions escape from an electrode active material, and if the battery is rested for a long time under such an unstable state, the electrode active material generally deteriorates faster. In detail, if a charging time is long considering a user environment of a laptop, a battery lifespan may be adversely affected, and thus the high temperature interval lifespan characteristics are a very important evaluation factor in terms of user environment of the battery.

In order to improve the high temperature interval lifespan characteristics, a method of doping a heterogeneous element on a composite metal hydroxide has been suggested, but according to the method, capacity is decreased despite the increase in the high temperature interval lifespan characteristics.

Considering the above, the present inventors have discovered that an amount of Mg (for example, an amount of impurity Mg) in a composite metal hydroxide and positive electrode active material obtained therefrom is an important factor in improving high temperature interval lifespan characteristics of a positive electrode including the positive electrode active material. Accordingly, by controlling an amount of Mg, a positive electrode having excellent capacity characteristics and improved high temperature interval lifespan characteristics may be manufactured.

If the amounts of Mg in the composite metal precursor and positive electrode active material exceed 0.005 wt %, Mg is introduced instead into a lithium site during lithium deintercalation of the positive electrode active material, thereby changing a lithium intercalation/deintercalation process into an irreversible reaction. Thus, capacity and high temperature interval lifespan of an electrode prepared by using the positive electrode active material are dramatically deteriorated.

The composite metal precursor and positive electrode active material may be spherical particles. Here, a spherical shape may be circular or oval, but is not limited thereto.

Hereinafter, methods of manufacturing a composite metal precursor and positive electrode active material formed from the same will be described.

Manufacturing of the composite metal precursor will now be described with reference to a method of manufacturing a compound represented by Formula 3 below.

$(Ni_{1-x-y}Co_xMn_y)Mg_a(OH)_2$ [Formula 3]

Here, in Formula 3, $0<a\le0.005$, $0<x\le0.3$, and $0\le y\le0.5$.

A nickel cobalt manganese precursor mixture is prepared by mixing a nickel precursor, a cobalt precursor, a manganese precursor, and a first solvent.

Nickel sulfate, nickel chloride, or nickel nitrate is used as the nickel precursor.

Cobalt sulfate, cobalt chloride, or cobalt nitrate is used as the cobalt precursor, and manganese sulfate, manganese chloride, or manganese nitrate is the manganese precursor.

The amounts of nickel precursor, cobalt precursor, and manganese precursor are stoichiometrically controlled to obtain the nickel composite hydroxide of Formula 3 above.

The first solvent may be water, ethanol, propanol, or butanol. The amount of first solvent is from about 100 parts by weight to about 2000 parts by weight based on 100 parts by weight of total weight of the nickel precursor, cobalt precursor, and manganese precursor.

A magnesium precursor mixture is separately obtained by mixing a magnesium precursor and a second solvent.

Magnesium sulfate, magnesium chloride, or magnesium nitrate is used as the magnesium precursor, and like the first solvent, water, ethanol, butanol, or propanol is used as the second solvent.

The amount of second solvent is from about 100 parts by weight to about 2000 parts by weight based on 100 parts by weight of the magnesium precursor.

The nickel cobalt manganese precursor mixture and the magnesium precursor mixture are mixed with each other, and a complex agent and a pH control agent are added and mixed thereto.

An ammonia solution is used as an ammonium ion supplier.

Examples of the pH control agent include a sodium hydroxide solution.

pH of the result product is controlled to a range from about 11 to about 13 by adjusting the amount of pH control agent.

A precipitate is obtained from the result product, and the composite metal precursor of Formula 3 may be obtained by washing and drying the result product by using pure water.

The drying is performed at a temperature from about 100° C. to about 120° C.

Then, the composite metal precursor is mixed with a lithium compound, and is thermally processed to obtain a lithium composite oxide represented by Formula 6 below.

$Li_m(Ni_{1-x-y}Co_xMn_y)Mg_aO_2$ [Formula 6]

Here, in Formula 6, $1.0\le m\le1.3$, $0<a\le0.005$, $0<x\le0.3$, and $0\le y\le0.5$.

Lithium hydroxide, lithium fluoride, lithium carbonate, or a mixture thereof is used as the lithium compound. The amount of lithium compound is stoichiometrically controlled such as to obtain an active material composition represented by Formula 6 above.

The thermal processing is performed at a temperature from about 700° C. to about 900° C. When the thermal processing is within the above range, it is easy to form the lithium composite oxide.

The thermal processing may be performed under an inert gas atmosphere. The insert gas atmosphere may be prepared by using a nitrogen gas or an argon gas.

The positive electrode active material is used for a lithium secondary battery, and by using the positive electrode active material, an electrode and lithium secondary battery having improved high temperature interval lifespan and capacity characteristics may be manufactured.

Hereinafter, processes of manufacturing a lithium secondary battery using the positive electrode active material as a positive electrode active material for a lithium battery will now be described, wherein a method of manufacturing a lithium secondary battery including a positive electrode, a negative electrode, a lithium salt containing non-aqueous electrolyte, and a separator, according to an embodiment is described.

A positive electrode and a negative electrode are manufactured by coating and drying a composition for forming a positive electrode active material layer and a composition for forming a negative electrode active material layer respectively on a positive electrode current collector and a negative electrode current collector.

The composition for forming the positive electrode active material is manufactured by mixing a positive electrode active material, a conducting agent, a binder, and a solvent, and here, the lithium composite oxide of Formula 6 above is used as the positive electrode active material.

The binder is a component supporting combination of an active material and a conducting agent and combination of a current collector, and is added from about 1 parts by weight to about 50 parts by weight based on 100 parts by weight of total weight of the positive electrode active material. Examples of the binder unlimitedly include polyvinylidene fluoride, polyvinyl alcohol, carboxy methyl cellulose (CMC), starch, hydroxyl propyl cellulose, regenerated cellulose, polyvinyl pyrrolidone, tetrafluoro ethylene, polyethylene, polypropylene, ethylene-propylene-diene terpolymer (EPDM), sulfonated EPDM, styrene butylene rubber, fluororubber, and various copolymers. In one embodiment, the amount of the binder is from about 2 parts by weight to about 5 parts by weight based on 100 parts by weight of total weight of the positive electrode active material.

The conducting agent is not specifically limited as long as it is conductive while not inducing a chemical change. Examples of the conducting agent include: graphite such as natural graphite or artificial graphite; carbon-based material such as carbon black, acetylene black, ketchen black, channel black, furnace black, lamp black, or summer black; conductive fiber such as carbon fiber or metal fiber; metal powder such as aluminum, or nickel powder; conductive whisky such as zinc oxide or potassium titanate; conductive metal oxide such as titanium oxide; and a conductive material such as polyphenylene derivative.

The amount of conducting agent is from about 2 parts by weight to about 5 parts by weight based on 100 parts by weight of total weight of the positive electrode active material. In one embodiment, when the amount of conducting agent is within the above range, conductive characteristics of an electrode finally obtained are excellent.

Examples of the solvent unlimitedly include N-methylpyrrolidone.

The amount of solvent is from about 1 part by weight to about 10 parts by weight based on 100 parts by weight of the positive electrode active material. In one embodiment, when the amount of the solvent is within the above range, it is easy to form an active material layer.

The positive electrode current collector has a thickness from about 3 μm to about 500 μm, and is not specifically limited as long as it has high conductivity while not inducting a chemical change to the battery. Examples of the positive electrode current collector include stainless steel, aluminum, nickel, titanium, thermally processed carbon, and aluminum and stainless steel that are surface-processed by carbon, nickel, titanium, or silver. An adhesiveness of the positive electrode current collector to the positive electrode active material may be increased by forming minute unevenness on a surface of the positive electrode current collector, and the positive electrode current collector may formed into various suitable structures, such as a film structure, a sheet structure, a foil structure, a net structure, a porous structure, a foaming structure, or a non-woven structure.

The composition for forming the negative electrode active material layer is separately prepared by mixing a negative electrode active material, a binder, a conducting agent, and a solvent.

The negative electrode active material may be a material that is capable of occluding and emitting lithium ions. Examples of the negative electrode active material unlimitedly include graphite, carbon-based material such as carbon, lithium metal, an alloy thereof, or a silicon oxide-based material. According to an embodiment silicon oxide is used.

The binder is added from about 1 part by weight to about 50 parts by weight based on 100 parts by weight of total weight of the negative electrode active material. Examples of the binder unlimitedly include same types as those of the positive electrode.

The amount of conducting agent is from about 1 part by weight to about 5 parts by weight based on 100 parts by weight of total weight of the negative electrode active material. In one embodiment, when the amount of conducting agent is within the above range, conductive characteristics of an electrode finally obtained are excellent.

The amount of solvent is from about 1 part by weight to about 10 parts by weight based on 100 parts by weight of total weight of the negative electrode active material. In one embodiment, when the amount of solvent is within the above range, it is easy to form the negative electrode active material layer.

The same types of materials as those used in the manufacturing of the positive electrode may be used for the conducting agent and the solvent.

The negative electrode current collector generally has a thickness from about 3 μm to about 500 μm, and is not specifically limited as long as it is conductive while not inducting a chemical change to the battery. Examples of the negative electrode current collector include copper, stainless steel, aluminum, nickel, titanium, thermally processed carbon, copper and stainless steel that are surface-processed by carbon, nickel, titanium, or silver, and aluminum-cadmium alloy. Like the positive electrode current collector, an adhesiveness of the negative electrode current collector to the negative electrode active material may be increased by forming minute unevenness on a surface of the negative electrode current collector, and the negative electrode current collector may be formed into any one of various suitable structures, such as a film structure, a sheet structure, a foil structure, a net structure, a porous structure, a foaming structure, or a non-woven structure.

A separator is disposed between the positive electrode and the negative electrode manufactured as above.

The separator has a pore diameter from about 0.01 μm to about 10 μm, and has a thickness from about 5 μm to about 300 μm. Examples of the separator include olefine-based polymer such as polypropylene or polyethylene; and sheet and non-woven fabric formed of glass fiber. When a solid electrolyte, such as polymer, is used as the electrolyte, the solid electrolyte may also function as the separator.

The lithium salt containing non-aqueous electrolyte includes non-aqueous electrolyte solution and lithium. A non-aqueous electrolyte solution, an organic solid electrolyte, or inorganic solid electrolyte is used as the non-aqueous electrolyte.

Examples of the non-aqueous electrolyte solution include an aprotic organic solvent such as N-methyl-2-pyrrolidinone, propylene carbonate, ethylene carbonate, butylene carbonate, N,N-dimethyl carbonate, diethyl carbonate, gamma-butylo lactone, 1,2-dimethoxy ethane, 2-methyl tetrahydrofuran, dimethylsulfoxide, 1,3-dioxorane, N,N-formamide, N,N-dimethylformamide, acetonitrile, nitromethane, methyl formate, methyl acetate, phosphite triester, trimethoxy methane, dioxorane derivatives, sulforan, methyl sulforan, 1,3-dimethyl-2-imidazolidinone, propylene carbonate, tetrahydrofuran, ether, propionic acid methyl, and propionic acid ethyl.

Examples of the organic solid electrolyte unlimitedly include polyethylene derivatives, polyethylene oxide derivatives, polypropylene oxide derivatives, phosphoric acid ester polymer, polyester sulfide, polyvinyl alcohol, and polyfluoride vinylidene. Examples of the inorganic solid electrolyte unlimitedly include Li nitrates such as $Li_3N$, LiI, $Li_5NI_2$, $Li_3N$—LiI—LiOH, $Li_2SiS_3$, $Li_4SiO_4$, $Li_4SiO_4$—LiI—LiOH, and $Li_3PO_4$—$Li_2S$—$SiS_2$, halides, and sulfates.

The lithium salt is a material that is easily dissolved in the non-aqueous electrolyte, and examples of the lithium salt unlimitedly include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, low aliphatic carboxylic acid lithium, and tetraphenyl boric acid lithium.

FIG. 1 is a schematic view of a lithium secondary battery 30 according to an embodiment of the present invention.

Referring to FIG. 1, the lithium secondary battery 30 includes a positive electrode 23, a negative electrode 22, a separator 24 disposed between the positive electrode 23 and the negative electrode 22, an electrolyte impregnated in the positive electrode 23, the negative electrode 22, and the separator 24, a battery container 25, and a sealing member 26 sealing the battery container 25. The lithium secondary battery 30 may be prepared by sequentially stacking the positive electrode 23, the negative electrode 22, and the separator 24, and winding and accommodating thereof in the battery container 25. The battery container 25 is sealed by the sealing member 26, thereby completing the lithium secondary battery 30.

The embodiments of the present invention will be described in greater detail with reference to the following examples. The following examples are for illustrative purposes only and are not intended to limit the scope of the invention.

Preparation Example 1

Preparation of Composite Metal Precursor 0.5 kg of nickel sulfate, 0.2 kg of cobalt sulfate, 0.2 kg of manganese sulfate, 0.6 kg of sodium hydroxide, and 0.2 kg of ammonia solution was mixed to prepare a nickel cobalt manganese precursor mixture.

0.3 g of magnesium carbonate constituting a magnesium raw material was added to the nickel cobalt manganese precursor mixture, thereby obtaining a magnesium-containing precursor mixture.

pH of the magnesium-containing precursor mixture was controlled to about 12.

Precipitates were obtained from the magnesium-containing precursor mixture, and $Ni_{0.5}Co_{0.2}Mn_{0.3}Mg_{0.001}(OH)_2$ constituting a composite metal precursor was prepared by washing the precipitates with pure water and drying at 120° C.

Preparation Example 2

Preparation of Composite Metal Precursor $Ni_{0.5}Co_{0.2}Mn_{0.3}Mg_{0.0035}(OH)_2$ constituting a composite metal precursor was prepared in the same manner as in Preparation Example 1, except that the amount of magnesium carbonate was 1.05 g.

Comparative Preparation Example 1

Preparation of Composite Metal Precursor $Ni_{0.5}Co_{0.2}Mn_{0.3}Mg_{0.0052}(OH)_2$ constituting a composite metal precursor was prepared in the same manner as in Preparation Example 1, except that the amount of magnesium carbonate was 1.56 g.

Example 1

Preparation of Positive Electrode Active Material 44.7 g of $Li_2CO_3$ was added to 108 g of the composite metal precursor prepared according to Preparation Example 1, and the result product was thermally processed at 950° C. Then, the thermally processed result product was pulverized and dry-filtered to manufacture $LiNi_{0.5}Co_{0.2}Mn_{0.3}Mg_{0.001}O_2$ constituting a positive electrode active material.

Example 2

Preparation of Positive Electrode Active Material $LiNi_{0.5}Co_{0.2}Mn_{0.3}Mg_{0.0035}O_2$ constituting a positive electrode active material was manufactured in the same manner as in Example 1, except that the composite metal precursor prepared according to Preparation Example 2 was used instead of the composite metal precursor of Preparation Example 1.

Comparative Example 1

Preparation of Positive Electrode Active Material $LiNi_{0.5}Co_{0.2}Mn_{0.3}Mg_{0.0052}O_2$ constituting a positive electrode active material was prepared in the same manner as in Example 1, except that the composite metal precursor prepared according to Comparative Preparation Example 1 was used instead of the composite metal precursor of Preparation Example 1.

Manufacture Example 1

Manufacture of Coin Cell

A coin cell was produced as follows by using $LiNi_{0.5}Co_{0.2}Mn_{0.3}Mg_{0.001}O_2$ constituting the positive electrode active material of Example 1.

Bubbles were removed from a mixture of 96 g of the positive electrode active material of Example 4, 2 g of polyvinylidene fluoride, 47 g of N-methyl pyrrolidone constituting a solvent, and 2 g of carbon black constituting a conducting agent by using a mixer to prepare a slurry for forming a positive electrode active material layer, which is uniformly dispersed.

The slurry was formed to have a thin pole plate shape by coating the slurry on an aluminum thin foil by using a doctor blade, and then the result product was dried for 3 hours at 135° C., rolled, and vacuum-dried to produce a positive electrode.

A coin cell was manufactured by using the positive electrode and a lithium metal counter electrode. A separator (thickness: about 16 μm) formed of porous polyethylene (PE) was disposed between the positive electrode and the lithium metal counter electrode, and an electrolyte solution was injected thereto to manufacture the coin cell.

Here, the electrolyte solution was a solution including 1.1 M $LiPF_6$ dissolved in a solvent in which ethylenecarbonate (EC) and ethylmethylcarbonate (EMC) are mixed at a volume ratio of 3:5.

Manufacture Example 2

Manufacture of Coin Cell

A coin cell was manufactured in the same manner as Manufacture Example 1, except that $LiNi_{0.6}Co_{0.2}Mn_{0.3}Mg_{0.0035}O_2$ constituting the positive electrode active material of Example 2 was used instead of $LiNi_{0.5}Co_{0.2}Mn_{0.3}Mg_{0.001}O_2$ constituting the positive electrode active material of Example 1.

Comparative Manufacture Example 1

Production of Coin Cell

A coin cell was manufactured in the same manner as Manufacture Example 1, except that $LiNi_{0.5}Co_{0.2}Mn_{0.3}Mg_{0.0052}O_2$ constituting the positive electrode active material of Comparative Example 1 was used instead of $LiNi_{0.5}Co_{0.2}Mn_{0.3}Mg_{0.001}O_2$ constituting the positive electrode active material of Example 1.

Evaluation Example 1

Inductively Coupled Plasma (ICP) Analysis

ICP Analysis on Composite Metal Precursor

An ICP analysis (ICP-AES, ICPS-8100, SHIMADZU/RF source 27.12 MHz/sample uptake rate 0.8 ml/min) was performed in order to analyze components in the composite metal precursors of Preparation Examples 1 and 2 and Comparative Preparation Example 1, and results thereof are shown in Table 2 below (a metal amount is shown based on 100 wt % of a composite metal precursor).

TABLE 1

| | Amount of Metal (mol %) | | | Amount of Metal (wt %) | | | | | |
|---|---|---|---|---|---|---|---|---|---|
| | Ni | Co | Mn | Ca | Cu | Fe | Na | S | Mg |
| Preparation Example 1 | 50.58 | 20.03 | 29.39 | 0.0020 | 0.0011 | 0.0048 | 0.0153 | 0.1195 | 0.0010 |
| Preparation Example 2 | 50.58 | 19.92 | 29.5 | 0.0022 | 0.0007 | 0.0046 | 0.0166 | 0.1266 | 0.0035 |
| Comparative Preparation Example 1 | 50.58 | 19.94 | 29.48 | 0.0035 | 0.001 | 0.0041 | 0.0125 | 0.125 | 0.0055 |

2) ICP Analysis on Positive Electrode Active Material

An ICP analysis (ICP-AES, ICPS-8100, SHIMADZU/RF source 27.12 MHz/sample uptake rate 0.8 ml/min) was performed in order to analyze components in the positive electrode active materials of Examples 1 and 2 and Comparative Example 1, and results thereof are shown in Table 2 below (a metal amount is shown based on 100 wt % of a positive electrode active material).

TABLE 2

| | Amount of Metal (mol %) | | | Amount of Metal (wt %) | | | | | |
|---|---|---|---|---|---|---|---|---|---|
| | Ni | Co | Mn | Ca | Cu | Fe | Na | S | Mg |
| Example 1 | 50.37 | 20.13 | 29.5 | 0.0018 | 0.0010 | 0.0043 | 0.0147 | 0.114 | 0.0008 |
| Example 2 | 50.35 | 20.07 | 29.58 | 0.0020 | 0.0007 | 0.0041 | 0.0156 | 0.12 | 0.0031 |
| Comparative Example 1 | 50.38 | 20.04 | 29.58 | 0.0028 | 0.001 | 0.0035 | 0.0111 | 0.121 | 0.0052 |

Evaluation Example 2

Analysis on Negative Ion

A negative ion analysis (Combustion IC, AQF-100, Mitsubishi/inlet 1000° C., outlet 1100° C., absorption time 12 min., ICS-2000, Dionex/ASRS18 column, KOH eluent, flow-rate 1.0 mL/min) was performed on the composite metal precursors of Preparation Examples 1 and 2 and Comparative Preparation Example 1.

Results of the negative ion analysis are shown in Table 3 below.

TABLE 3

| | Amount of Metal (wt %) | |
|---|---|---|
| | Fluoride (ppm) | Chloride (ppm) |
| Preparation Example 1 | 0.76 | 3.11 |
| Preparation Example 2 | 2.99 | 2.06 |
| Comparative Preparation Example 1 | 324.18 | 53.78 |

Evaluation Example 3

Evaluation on Properties of Composite Metal Precursor

Average particle diameters, tap densities, and amounts of moisture of the composite metal precursors of Preparation Examples 1 and 2 and Comparative Preparation Example 1 were measured and shown in Table 4 below. Here, the average particle diameters were measured by using a laser diffraction particle size analyzer (LS13320, Beckmann), the tap densities were measured by using a GeoPyc 1360, Microtrac), and the amounts of moisture were measured by using a moisture measurer (Automatic Karl-Fischer Coulometer Metrohm 831/774 System, Metrohm).

TABLE 4

| | D10 (μm) | D90 (μm) | Tap Density (g/cm³) | SSA (m²/g) | Amount of Moisture (wt %) |
|---|---|---|---|---|---|
| Preparation Example 1 | 6.67 | 11.14 | 2.32 | 9.17 | 0.33 |

TABLE 4-continued

|  | D10 (μm) | D90 (μm) | Tap Density (g/cm$^3$) | SSA (m$^2$/g) | Amount of Moisture (wt %) |
|---|---|---|---|---|---|
| Preparation Example 2 | 6.42 | 11.61 | 2.36 | 8.49 | 0.32 |
| Comparative Manufacture 1 | 6.65 | 18.93 | 2.27 | 9.01 | 0.30 |

Evaluation Example 4

Evaluation on High Temperature Interval Lifespan

High temperature interval lifespan of the coin cells of Manufacture Examples 1 and 2 and Comparative Manufacture Example 1 was evaluated.

Charging and discharging characteristics of the coin cells were evaluated by using a charging and discharging device (Manufacturer: TOYO, Model Name: TOYO-3100).

The coin cells of Manufacture Examples 1 and 2 and Comparative Manufacture Example 1 were charged for 10 minutes at 40° C. under a constant current of 0.8 C and a constant voltage of 4.2 V (110 mA cut-off), rested for 24 hours, and then discharged for 30 minutes at 40° C. under a constant current of 0.5 C (3.0 V cut-off). The coin cells were charged and discharged for 80 cycles under such conditions.

After 80 cycles, capacity retention rates were measured as discharge capacity changes, and the high temperature interval lifespan of each coin cell was evaluated.

Results of evaluating the high temperature interval lifespan are shown in Table 5 below and FIG. 2.

TABLE 5

|  | High Temperature Interval Lifespan (%) |
|---|---|
| Manufacture Example 1 | 93 |
| Manufacture Example 2 | 92 |
| Comparative Manufacture Example 1 | 85 |

Figure 2:
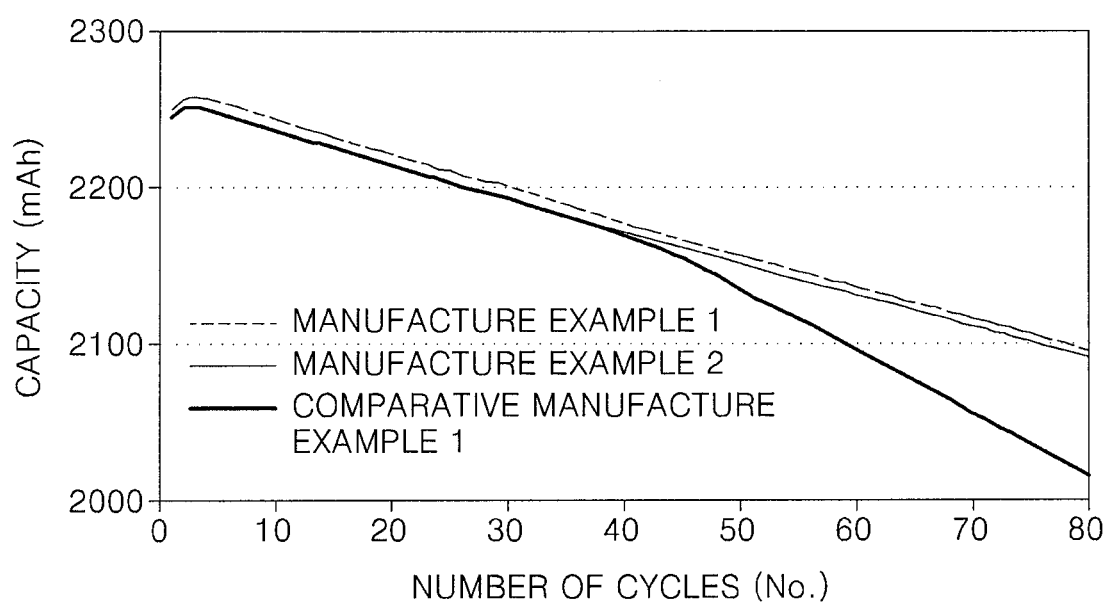
FIG. 2 is a graph showing high temperature interval lifespan characteristics in coin cells manufactured according to Manufacture Examples 1 and 2 and Comparative Manufacture Example 1.

Referring to Table 5 and FIG. 2, the high temperature interval lifespan characteristics of the coin cells of Manufacture Examples 1 and 2 are improved compared to that of the coin cell of Comparative Manufacture Example 1.

As described above, according to the one or more of the above embodiments of the present invention, a lithium secondary battery having an improved high temperature interval lifespan and excellent capacity characteristics can be manufactured by using the electrode active material formed from the composite metal precursor.

It should be understood that the exemplary embodiments described therein should be considered in a descriptive sense only and not for purposes of limitation. Descriptions of features or aspects within each embodiment should typically be considered as available for other similar features or aspects in other embodiments.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A positive electrode active material represented by Formula 6:

$$Li_m(Ni_{1-x-y}Co_xMn_y)Mg_aO_2 \quad [\text{Formula 6}]$$

wherein in Formula 6, $1.0 \le m \le 1.3$, $0.001 \le a \le 0.0035$, $0 < x \le 0.3$, and $0 \le y \le 0.5$.

2. The positive electrode active material of claim 1, wherein the positive electrode active material is $LiNi_{0.5}Co_{0.2}Mn_{0.3}Mg_{0.001}O_2$ or $LiNi_{0.5}Co_{0.2}Mn_{0.3}Mg_{0.0035}O_2$.

* * * * *